United States Patent
Sekar

(10) Patent No.: US 9,586,374 B2
(45) Date of Patent: *Mar. 7, 2017

(54) METHODS FOR MANUFACTURING A PAINT ROLLER AND COMPONENT PARTS THEREOF WITH COMPOSITE COVER MATERIAL

(71) Applicant: Sekar Patent Holdings, LLC, Searingtown, NY (US)

(72) Inventor: Chandra Sekar, Searingtown, NY (US)

(73) Assignee: Sekar Patent Holdings, LLC, Searingtown, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/789,723

(22) Filed: Jul. 1, 2015

(65) Prior Publication Data

US 2016/0176139 A1 Jun. 23, 2016

Related U.S. Application Data

(60) Continuation of application No. 14/225,101, filed on Mar. 25, 2014, now Pat. No. 9,126,370, which is a
(Continued)

(51) Int. Cl.
*B29C 53/60* (2006.01)
*B29D 99/00* (2010.01)
(Continued)

(52) U.S. Cl.
CPC ...... *B29D 99/0032* (2013.01); *B05C 17/0207* (2013.01); *B05C 17/0215* (2013.01); *B29C 53/581* (2013.01); *B29C 63/105* (2013.01); *B29C 65/48* (2013.01); *B29C 65/4855* (2013.01); *B29C 65/525* (2013.01); *B29C 66/5326* (2013.01); *B29D 23/001* (2013.01);
(Continued)

(58) Field of Classification Search
CPC .......... B29L 2031/328; B05C 17/0207; B29C 47/0059; B29C 53/58; B29C 53/583; B29C 53/60; B29C 53/607; B29C 53/62; B29C 53/64; B29D 99/0032; B29K 2023/10; B29K 2023/12; B29K 2023/14
See application file for complete search history.

(56) References Cited

U.S. PATENT DOCUMENTS

| 5,572,790 A * | 11/1996 | Sekar | B05C 17/0207 29/527.2 |
| 8,486,211 B2 * | 7/2013 | Sekar | B29D 99/0035 156/184 |
| 8,771,451 B2 * | 7/2014 | Sekar | B32B 37/1284 156/185 |

FOREIGN PATENT DOCUMENTS

WO WO 00/44969 * 8/2000

* cited by examiner

Primary Examiner — Carson Gross
(74) Attorney, Agent, or Firm — Greenberg Traurig, LLP

(57) ABSTRACT

Described are methods of making a paint roller using thermoplastic strip material, adhesive and a composite cover material. The materials can be assembled in a continuous manufacturing process by helically winding a strip comprising polypropylene around a mandrel so as to form a helically wound strip, advancing the wound strip along the mandrel, applying a molten layer of adhesive comprising polypropylene onto the outer surface of the wound strip, wrapping a strip of composite cover material about the wound strip and over the layer of adhesive, and allowing the adhesive to cool, thereby laminating the composite cover material with the outer surface of the wound strip.

15 Claims, 5 Drawing Sheets

Related U.S. Application Data continuation of application No. 13/081,103, filed on Apr. 6, 2011, now Pat. No. 8,764,928, which is a division of application No. 12/687,028, filed on Jan. 13, 2010, now Pat. No. 8,142,587, which is a continuation-in-part of application No. 12/435,946, filed on May 5, 2009.

(51) Int. Cl.

| | |
|---|---|
| *B29C 53/58* | (2006.01) |
| *B29C 63/10* | (2006.01) |
| *B29D 23/00* | (2006.01) |
| *B05C 17/02* | (2006.01) |
| *B29C 65/48* | (2006.01) |
| *B29C 65/52* | (2006.01) |
| *B29C 65/00* | (2006.01) |
| *B29C 47/00* | (2006.01) |
| *B29C 47/38* | (2006.01) |
| *B29C 63/00* | (2006.01) |
| *B29C 63/48* | (2006.01) |
| *B29K 23/00* | (2006.01) |
| *B29K 105/04* | (2006.01) |
| *B29L 23/00* | (2006.01) |
| *B29L 31/32* | (2006.01) |
| *B29C 47/02* | (2006.01) |
| *B29C 47/06* | (2006.01) |
| *B29K 105/16* | (2006.01) |
| *B29K 509/00* | (2006.01) |
| *B29L 9/00* | (2006.01) |

(52) U.S. Cl.
CPC ...... *B29D 99/0035* (2013.01); *B29C 47/0023* (2013.01); *B29C 47/0038* (2013.01); *B29C 47/0042* (2013.01); *B29C 47/021* (2013.01); *B29C 47/065* (2013.01); *B29C 47/38* (2013.01); *B29C 53/607* (2013.01); *B29C 63/0069* (2013.01); *B29C 2063/485* (2013.01); *B29C 2793/009* (2013.01); *B29K 2023/10* (2013.01); *B29K 2023/12* (2013.01); *B29K 2105/04* (2013.01); *B29K 2105/16* (2013.01); *B29K 2509/00* (2013.01); *B29L 2009/00* (2013.01); *B29L 2023/00* (2013.01); *B29L 2031/328* (2013.01)

METHODS FOR MANUFACTURING A PAINT ROLLER AND COMPONENT PARTS THEREOF WITH COMPOSITE COVER MATERIAL

This application is a continuation of U.S. patent application Ser. No. 14/225,101 filed Mar. 25, 2014, which is a continuation of U.S. patent application Ser. No. 13/081,103 filed Apr. 6, 2011, which is a divisional of U.S. patent application Ser. No. 12/687,028, now U.S. Pat. No. 8,142,587 filed Jan. 13, 2010, which is a continuation-in-part of U.S. patent application Ser. No. 12/435,946 filed May 5, 2009, the entire disclosures of which are incorporated herein by reference.

This application includes material which is subject to copyright protection. The copyright owner has no objection to the facsimile reproduction by anyone of the patent disclosure, as it appears in the Patent and Trademark Office files or records, but otherwise reserves all copyright rights whatsoever.

FIELD OF THE INVENTION

This invention pertains to methods and apparatus for making paint rollers of the type used for applying paint to walls and the like. More specifically, the invention pertains to methods and apparatus for making component parts for use in a process of making a paint roller, and methods and apparatus for making a paint roller.

BRIEF DESCRIPTION OF THE DRAWINGS

In the accompanying drawings forming a part of this specification, and in which like reference characters are employed to designate like parts throughout the same.

DETAILED DESCRIPTION OF THE INVENTION AND EMBODIMENTS THEREOF

Figure 1:
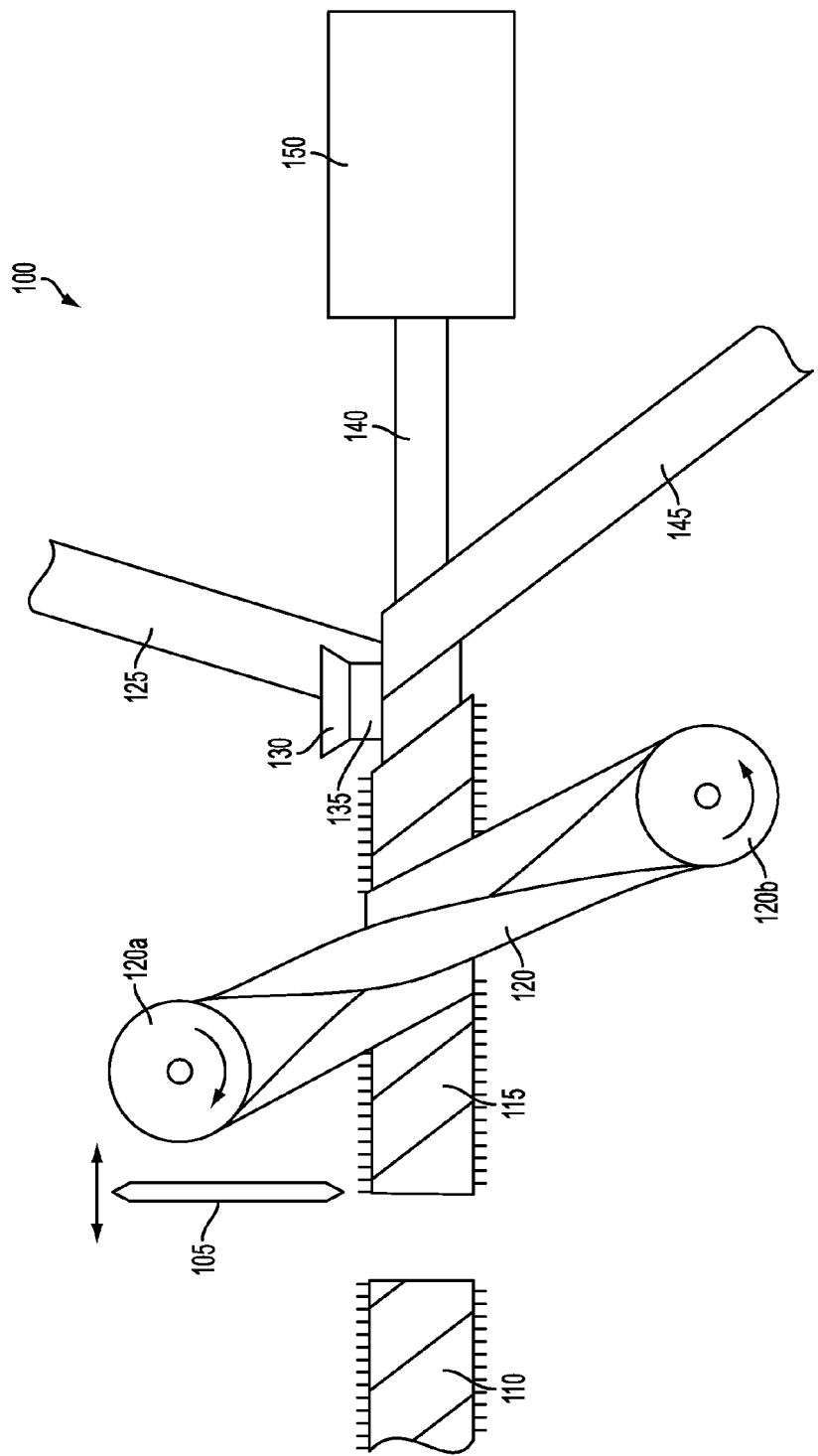
FIG. 1 is a diagrammatic representation of a paint roller manufacturing apparatus that can be used in accordance with an embodiment of the present invention.

FIG. 1 shows a diagrammatic representation of a paint roller manufacturing apparatus 100. A strip of material 145 comprising polypropylene is wrapped helically about a mandrel 140 held on a base 150. The mandrel may be cooled by a cooler (not shown). An adhesive 135 comprising polypropylene is applied to an outer surface of the strip 145 by applicator 130. A cover 125 is wrapped around the mandrel 150 over the first strip 145 and the adhesive 135. A helical belt 120 driven by rollers 120a, 120b applies a compressive force on the cover material and advances the tubular assembly 115 down the mandrel 150. A flyaway saw 105 cuts the tubular assembly into lengths 110 that can be used, or cut and used to produce finished paint rollers.

Compound Adhesive

In an embodiment, the adhesive 135 is a compound of polypropylene and calcium carbonate having between 5% and 50% calcium carbonate by weight. In an embodiment the adhesive compound comprises at least 25% but not more than 45% calcium carbonate. In an embodiment the adhesive compound comprises at least 25% but not more than 33% calcium carbonate. In an embodiment, the calcium carbonate compounded with the polypropylene to form the compound adhesive 135 should be selected and/or processed to be relatively non-abrasive to the processing equipment.

In an embodiment, the applicator 130 applies a compound adhesive 135 formed by a twin screw extruder sufficient for compounding the calcium carbonate with polypropylene (not shown) from a supply of polypropylene resin in pellet form and a supply of calcium carbonate. When using a twin screw extruder, the calcium carbonate should be relatively non-abrasive to an extruder.

In an embodiment, the calcium carbonate compounded with the polypropylene to form the compound adhesive 135 should be used in a relatively fine, powdered form. In an embodiment the calcium carbonate may have a median particle size of 3 micrometers or less. In an embodiment, the calcium carbonate compounded with the polypropylene to form the compound adhesive 135 may be surface treated.

The cost by weigh of calcium carbonate is expected to be lower than the cost by weigh of polypropylene, thus the use of a compounded adhesive 135 as described will reduce the cost of manufacturing paint rollers.

The adhesive 135 made from a compound of polypropylene and calcium carbonate having between 5% and 50% calcium carbonate by weight is expected to have higher thermal conductivity that an adhesive made from polypropylene alone. Accordingly, an adhesive 135 made from a compound of polypropylene and calcium carbonate having between 5% and 50% calcium carbonate by weight is expected to cool and set faster than an adhesive made from polypropylene alone. As a result of the higher thermal conductivity, when the apparatus 100 is operated using an adhesive 135 made from a compound of polypropylene and calcium carbonate having between 5% and 50% calcium carbonate by weight, it is expected that the apparatus will operate at higher overall throughput than it would when using an adhesive 135 comprising more than 95% polypropylene.

Compound Strip Material

In an embodiment, the strip 145 is made of a compound of polypropylene and calcium carbonate having between 5% and 50% calcium carbonate by weight. In an embodiment the strip 145 comprises at least 25% but not more than 45% calcium carbonate. In an embodiment the strip 145 comprises at least 25% but not more than 33% calcium carbonate.

In an embodiment, the calcium carbonate compounded with the polypropylene to form the strip 145 should be a relatively fine, powdered form of calcium carbonate. In an embodiment the calcium carbonate compounded with the polypropylene to form the strip 145 should have a median particle size of 3 micrometers or less. In an embodiment, the calcium carbonate compounded with the polypropylene to form the strip 145 may be surface treated.

The cost by weigh of calcium carbonate is expected to be lower than the cost by weigh of polypropylene, thus the use of a strip 135 made from a compound of polypropylene and calcium carbonate will reduce the cost of manufacturing paint rollers made therewith.

The strip 145 made from a compound of polypropylene and calcium carbonate having between 5% and 50% calcium carbonate by weight is expected to have higher thermal conductivity that an adhesive made from polypropylene alone. Because of the higher thermal conductivity using a strip 145 made from a compound of polypropylene and calcium carbonate having between 5% and 50% calcium carbonate by weight, rather than a strip 145 made from more than 95% polypropylene, it is anticipated that the adhesive 135 will set faster, and thus, apparatus 100 will operate at higher overall throughput than it would when using a strip 145 comprising more than 95% polypropylene.

Cover Material

In an embodiment, the cover 250 has a fabric backing and a pile outer surface such as knitted or woven cover materials; such a fabric backing of the cover 250 comprises interstitial pores into which adhesive 135 may flow, especially when compressed by the belt 120. In an embodiment, the cover is made from a microfiber material; such a microfiber cover 250 also comprises interstitial pores into which adhesive 135 may flow, especially when compressed by the belt 120.

In an embodiment, the cover 250 has a pile or microfiber outer surface and a smooth or uniformly imprinted backing formed from polypropylene.

In an embodiment, the cover 250 has a pile or microfiber outer surface and a smooth or uniformly imprinted backing formed from a compound of polypropylene and calcium carbonate having between 5% and 50% calcium carbonate by weight. In an embodiment the cover 250 comprises at least 25% but not more than 45% calcium carbonate. In an embodiment the cover 250 comprises at least 25% but not more than 33% calcium carbonate.

In an embodiment, the calcium carbonate compounded with the polypropylene to form the backing of the cover 250 should be a relatively fine, powdered form of calcium carbonate. In an embodiment the calcium carbonate compounded with the polypropylene to form the backing of the cover 250 should have a median particle size of 3 micrometers or less. In an embodiment, the calcium carbonate compounded with the polypropylene to form the backing of the cover 250 may be surface treated.

The cost by weigh of calcium carbonate is expected to be lower than the cost by weigh of polypropylene, thus the use of the backing of the cover 250 made from a compound of polypropylene and calcium carbonate will reduce the cost of manufacturing paint rollers made therewith.

The backing of the cover 250 made from a compound of polypropylene and calcium carbonate having between 5% and 50% calcium carbonate by weight is expected to have higher thermal conductivity that an adhesive made from polypropylene alone. Because of the higher thermal conductivity using a cover 250 having a backing made from a compound of polypropylene and calcium carbonate having between 5% and 50% calcium carbonate by weight, rather than a backing made from more than 95% polypropylene, it is anticipated that the adhesive 135 will set faster, and thus, apparatus 100 will operate at higher overall throughput than it would when using a cover 250 having a backing comprising more than 95% polypropylene.

Use Of Compounded Materials

Apparatus 100 may be operated according to the present invention using an adhesive 135 made of a compound of polypropylene and calcium carbonate having between 5% and 50% calcium carbonate by weight; using a strip 145 made of a compound of polypropylene and calcium carbonate having between 5% and 50% calcium carbonate by weight; and/or using a cover 250 having a backing made of a compound of polypropylene and calcium carbonate having between 5% and 50% calcium carbonate by weight. When more than one component is made of a compound of polypropylene and calcium carbonate having between 5% and 50% calcium carbonate by weight, the percentage of calcium carbonate used in the compound forming the adhesive 135, the strip 145 and the cover 250 backing may be the same, or may differ from one-another.

When compounding of polypropylene and calcium carbonate in any compound of between 5% and 50% calcium carbonate by weight, the calcium carbonate is not expected to melt. As discussed above, the resulting compounds are expected to have higher thermal conductivity. Variation in the amount of calcium carbonate are within the scope of the invention, and thus, it will be apparent to one of skill in the art that to some degree thermal conductivity can be controlled, or a desired thermal conductivity or range of thermal conductivity can be achieved by varying the percentage of calcium carbonate in the compound.

The compounds of polypropylene and calcium carbonate used in the adhesive 135, strip 145 and/or cover 250 are expected to have achieve other characteristics that, when compared to using polypropylene alone, are expected to include increased stiffness. Increased stiffness may give a paint roller a firmer or stiffer feel, which may improve its performance as a paint roller. Moreover, in many cases, stiffer or firmer paint rollers are sold at a higher price. It will be apparent to one of skill in the art that to some degree, stiffness can be controlled, or a desired stiffness or range of stiffness can be achieved by varying the percentage of calcium carbonate in the compound.

Figure 2:
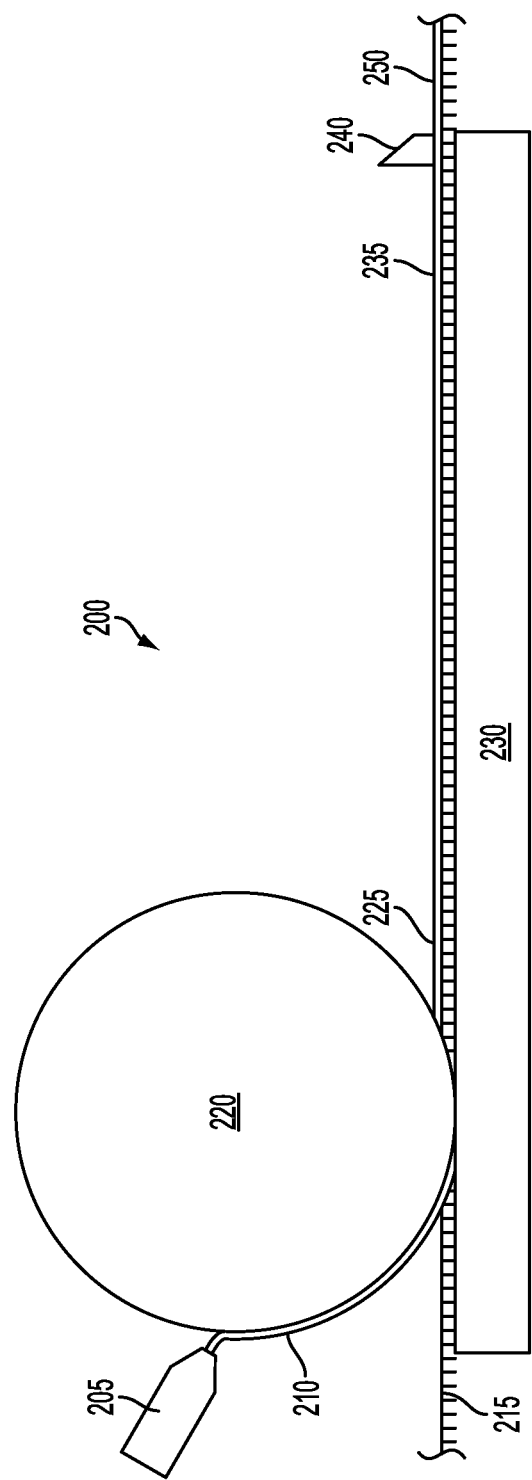
FIG. 2 is a diagrammatic representation of an apparatus for forming a composite paint roller cover having a compound backing in accordance with an embodiment of the present invention.

FIG. 2 shows an apparatus 200 for forming the composite paint roller cover 250 having a compound backing. The roller 220 is urged toward the frame 230 by a spring, by gravity or by other means that will be apparent to persons skilled in the art. A layer of compound adhesive 210 is dispensed by an applicator 205 onto a roller 220, and runs between the roller 220 and a frame 230, such as a tenter frame, or between the roller 220 and another roller (not shown). The layer of compound adhesive 210 dispensed onto roller 220 may be between 0.010" and 0.020". In an embodiment, the compound adhesive 210 is a compound of polypropylene and calcium carbonate having between 5% and 50% calcium carbonate by weight. In an embodiment the adhesive compound comprises at least 25% but not more than 45% calcium carbonate. In an embodiment the adhesive compound comprises at least 25% but not more than 33% calcium carbonate. The calcium carbonate should be relatively non-abrasive to the processing machinery.

The cover material 215 is advanced along the frame 205 with its pile side down, and moved beneath the roller 220. The cover material 215 may have a pile side and a fabric backing—the fabric backing being porous and having interstitial spaces sufficient to permit penetration of the compound adhesive 210. As the cover material 215 and the layer of compound adhesive 210 pass between the roller 220 and the surface of the frame 230 they are urged together. The roller-side of the compound adhesive 210 may be smoothed or uniformly imprinted (e.g., embossed) by the roller 220 as it passed underneath, thus forming a uniform or smooth adhesive layer surface 225.

In an embodiment, the roller 220 applies a compressive force to urge the compound adhesive 210 towards the cover material 215. In an embodiment, the compressive force is sufficient to force the compound adhesive 210 into the interstitial spaces within the fabric backing of the cover material 215. The resulting composite sheet material 235 may be cut by a cutter 240 to trim away any excess materials, and thus to form the compound composite cover material 250 with a non-porous backing.

In an embodiment, the roller 220 may be heated or cooled.

In an embodiment, the apparatus comprises an applicator 205 that applies a compound adhesive 210 formed by a twin screw extruder sufficient for compounding calcium carbonate with polypropylene (not shown) from a supply of polypropylene resin in pellet form and a supply of calcium carbonate. The calcium carbonate should be relatively non-abrasive to the twin screw extruder.

The positioning and angular orientation of the applicator 205 may be varied. In an embodiment, the applicator is angled between 30 degrees and 60 degrees from vertical and positioned within inches of the middle of the roller 220. In another embodiment the applicator 205 is within 30 degrees (+/−) of vertical, and is positioned to dispense adhesive such that the adhesive layer 210 first makes contact on the upper half of the roller 220. In yet another embodiment, the applicator 205 is within 30 degrees (+/−) of horizontal and is positioned to dispense adhesive such that the adhesive layer 210 first makes contact on the lower half of the roller 220. Variations in the angular orientation of the applicator 205, and its distance from and orientation around the roller are within the scope of the invention, and will be apparent to one skilled in the art.

Figure 3:
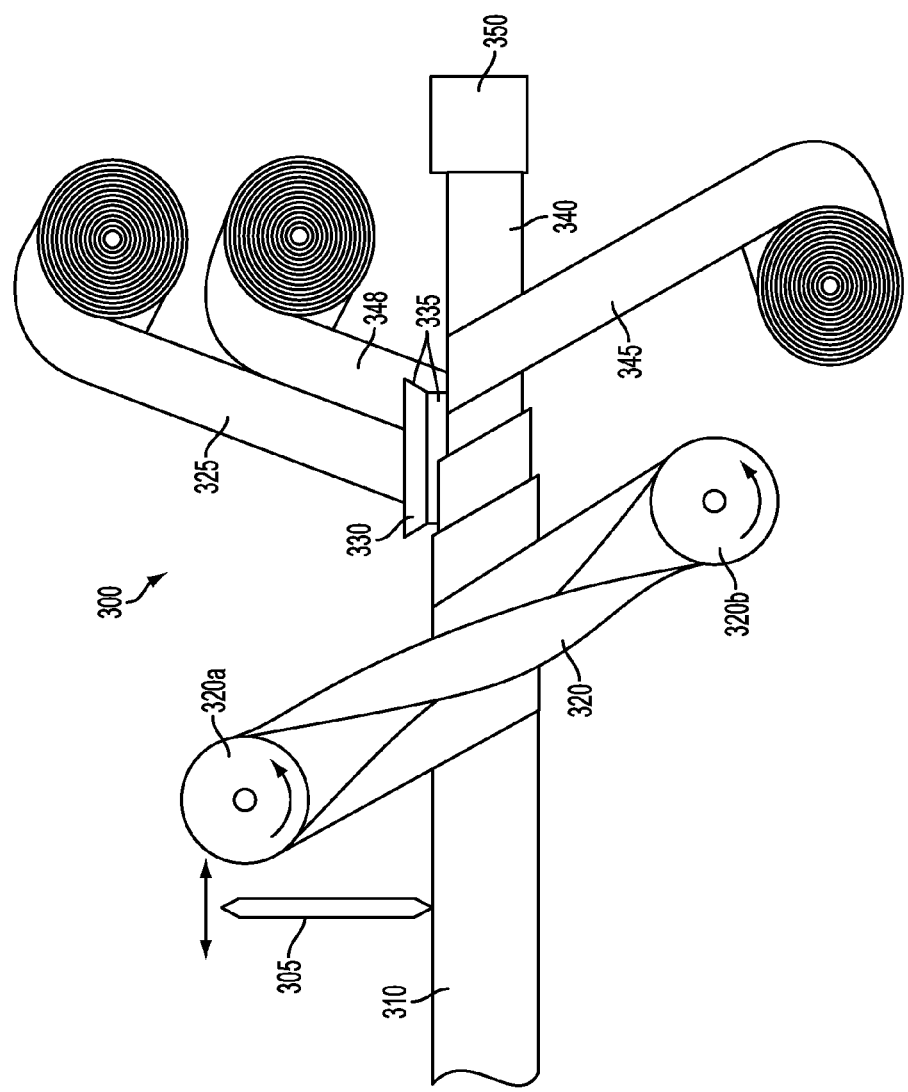
FIG. 3 is a diagrammatic representation of a multi-strip laminate paint roller manufacturing apparatus that can be used in accordance with an embodiment of the present invention.

FIG. 3 shows a paint roller manufacturing apparatus 300. A strip of material 345 comprising polypropylene is wrapped helically about a mandrel 340 held on a base 350. The mandrel may be cooled by a cooler (not shown). A second strip of material 348 comprising polypropylene is wrapped helically about the first strip 345. An adhesive 335 comprising polypropylene is applied to an outer surface of the strips 345, 348 by applicator 330. A cover 325 is also helically wrapped around the mandrel 350 over the strips 345, 348 and the adhesive 335. A helical belt 320 driven by rollers 320a, 320b applies a compressive force on the cover material and advances the tubular assembly 310 down the mandrel 350. A flyaway saw 305 may cut the tubular assembly 310 into lengths (not shown) that can be used, or further cut and used to produce finished paint rollers.

In an embodiment, the applicator 330 applies a compound adhesive 335 formed by a twin screw extruder sufficient for compounding the calcium carbonate with polypropylene (not shown) from a supply of polypropylene resin in pellet form and a supply of calcium carbonate. When using a twin screw extruder, the calcium carbonate should be relatively non-abrasive to a extruder.

Apparatus 300 may be operated according to the present invention using an adhesive 335 made of a compound of polypropylene and calcium carbonate having between 5% and 50% calcium carbonate by weight; using a strip 345 made of a compound of polypropylene and calcium carbonate having between 5% and 50% calcium carbonate by weight; using a second strip 348 made of a compound of polypropylene and calcium carbonate having between 5% and 50% calcium carbonate by weight; and/or using a cover 325 having a backing made of a compound of polypropylene and calcium carbonate having between 5% and 50% calcium carbonate by weight. When more than one component is made of a compound of polypropylene and calcium carbonate having between 5% and 50% calcium carbonate by weight, the percentage of calcium carbonate used in the compound forming the adhesive 335, the strip 345, the second strip 348 and the cover 325 backing may be the same, or may differ from one-another.

Variation in the amount of calcium carbonate are within the scope of the invention, and thus, it will be apparent to one of skill in the art that to some degree thermal conductivity can be controlled, or a desired thermal conductivity or range of thermal conductivity can be achieved by varying the percentage of calcium carbonate in one or more of the compounds. It will be apparent to one of skill in the art that to some degree, stiffness can be controlled, or a desired stiffness or range of stiffness can be achieved by varying the percentage of calcium carbonate in these compounds as well.

Figure 4:
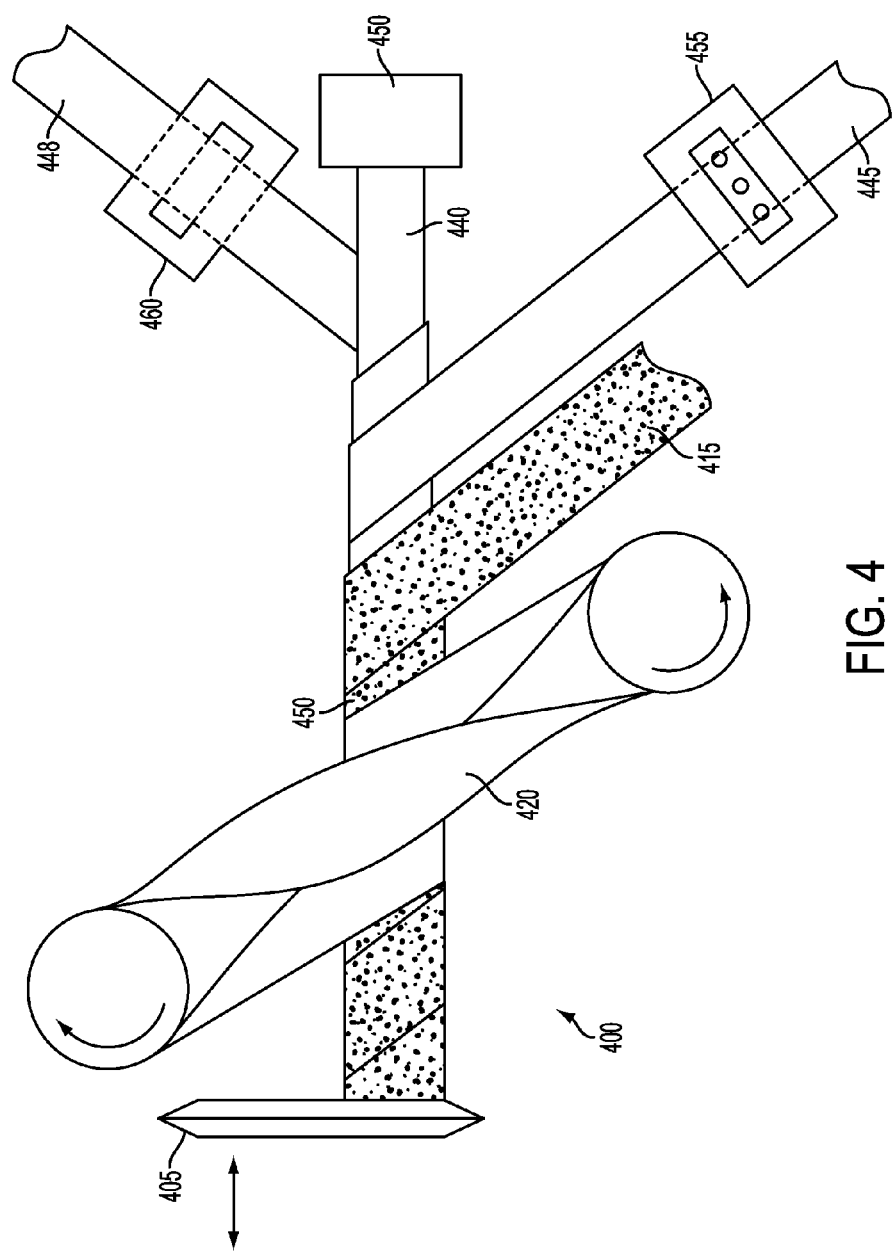
FIG. 4 is a diagrammatic representation of another paint roller manufacturing apparatus that can be used in accordance with an embodiment of the present invention.

FIG. 4 shows a paint roller manufacturing apparatus 400. A strip of material 448 comprising polypropylene is wrapped helically about a mandrel 440 held on a base 450. The mandrel may be cooled by a cooler (not shown). A second strip of material 445 comprising polypropylene is wrapped helically about the first strip 448. The heaters 460, 455 which may employ heating elements or heat by open flame, heat the outer surface (vis-à-vis the wrapping about the mandrel) of strips 448, 445 respectively. The heat produced by the heaters 460 is sufficient to cause the outer surface of the strips 448, 445 to become tacky, or to liquefy, or to become molten. (Although shown diagrammatically at a distance from the mandrel, in an embodiment, the heaters 460, 455 should be placed as close as practicable to the point where the strips 448, 445 contact the mandrel.) A cover 415 is also helically wrapped around the mandrel 440 over the outer surface of the second strip 445. A helical belt drive 420 applies an inwardly compressive force on the cover material 415 and advances the assembly down the mandrel 440. A flyaway saw 405 may cut the assembly into lengths (not shown) that can be used, or further cut and used to produce finished paint rollers.

Apparatus 400 may be operated according to the present invention using a strip 448 made of a compound of polypropylene and calcium carbonate having between 5% and 50% calcium carbonate by weight; using a second strip 445 made of a compound of polypropylene and calcium carbonate having between 5% and 50% calcium carbonate by weight; and/or using a cover 415 having a backing made of a compound of polypropylene and calcium carbonate having between 5% and 50% calcium carbonate by weight. When more than one component is made of a compound of polypropylene and calcium carbonate having between 5% and 50% calcium carbonate by weight, the percentage of calcium carbonate used in the compound forming the strips 448, 445 and the cover 415 backing may be the same, or may differ from one-another.

Variation in the amount of calcium carbonate are within the scope of the invention, and thus, it will be apparent to one of skill in the art that to some degree thermal conductivity can be controlled, or a desired thermal conductivity or range of thermal conductivity can be achieved by varying the percentage of calcium carbonate in one or more of the compounds. It will be apparent to one of skill in the art that to some degree, stiffness can be controlled, or a desired stiffness or range of stiffness can be achieved by varying the percentage of calcium carbonate in these compounds as well.

Figure 5:
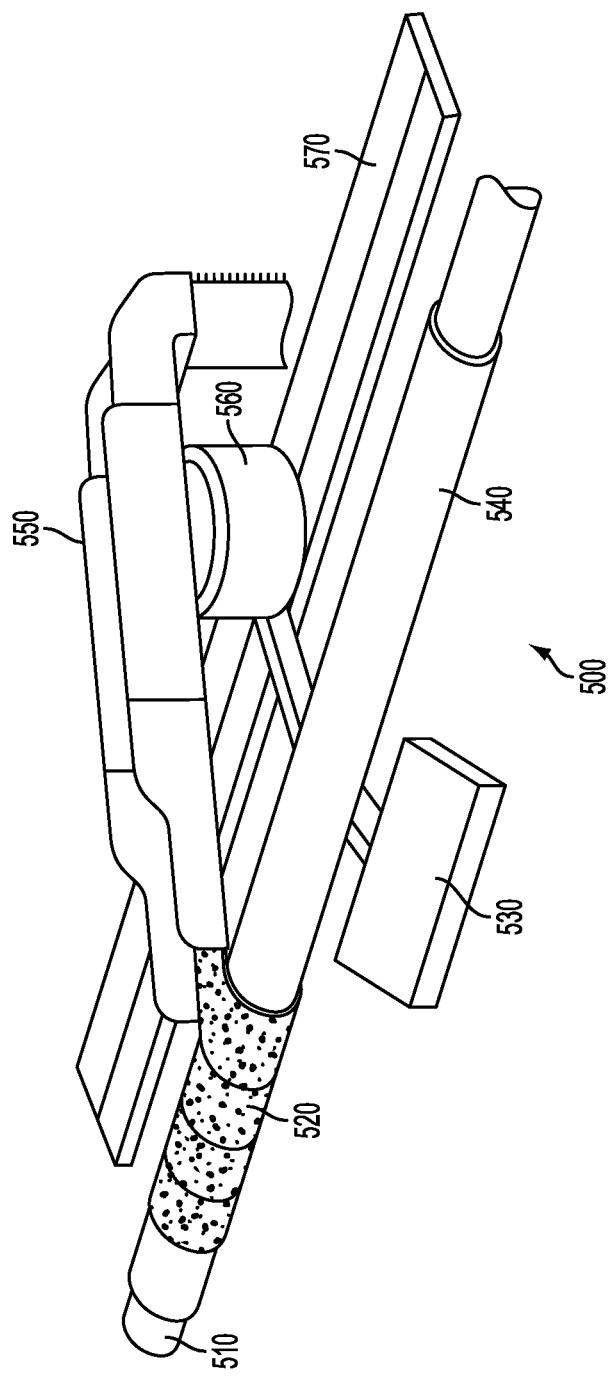
FIG. 5 is a diagrammatic representation of yet another paint roller manufacturing apparatus that can be used in accordance with an embodiment of the present invention.

FIG. 5 shows an apparatus 500 suitable for making paint rollers with a preformed core. The apparatus 500 comprises a rotating mandrel 510, a carriage 560 running on a stationary track 570 and supporting a cover material guide 550, and a heater 530. A preformed core 540 comprising polypropylene is placed about the mandrel 510. The heater 530 is activated, thereby heat softening the outer surface of the preformed core in an amount sufficient to bond to the backing of the cover 520. The cover 520 is wrapped helically about the core by the rotation of the mandrel and the movement of the carriage 560. The rotation of the mandrel 510 and the movement of the carriage 560 are such that the cover 520 is wrapped about substantially all of the preformed core 540.

Apparatus 500 may be operated according to the present invention using a preformed core 540 made of a compound of polypropylene and calcium carbonate having between 5% and 50% calcium carbonate by weight; and/or using a cover 520 having a backing made of a compound of polypropylene and calcium carbonate having between 5% and 50% calcium carbonate by weight. When more than one component is made of a compound of polypropylene and calcium carbonate having between 5% and 50% calcium carbonate by weight, the percentage of calcium carbonate used in the compound forming the core 540 and the cover 520 backing may be the same, or may differ from one-another.

Variation in the amount of calcium carbonate are within the scope of the invention, and thus, it will be apparent to one of skill in the art that to some degree thermal conductivity can be controlled, or a desired thermal conductivity or range of thermal conductivity can be achieved by varying the percentage of calcium carbonate in one or more of the compounds. It will be apparent to one of skill in the art that to some degree, stiffness can be controlled, or a desired stiffness or range of stiffness can be achieved by varying the percentage of calcium carbonate in these compounds as well.

It is possible, without departing from the invention, to use a compound of polypropylene and calcium carbonate having between 5% and 50% calcium carbonate by weight in lieu of polypropylene in making paint rollers. In light of this disclosure, other methods for the manufacture of the same will be apparent to persons of skill in the art.

Benefits of certain embodiments of the instant invention include: control of thermal conductivity in the component materials leading to faster throughput and/or faster set times; and control of material characteristics such as stiffness for manufacture of harder, more expensive paint rollers.

The above embodiments and preferences are illustrative of the present invention. It is neither necessary, nor intended for this patent to outline or define every possible combination or embodiment. The inventor has disclosed sufficient information to permit one skilled in the art to practice at least one embodiment of the invention, and has disclosed the ways the inventor now believes are the best ways to practice the invention. The above description and drawings are merely illustrative of the present invention and that changes in components, structure and procedure are possible without departing from the scope of the present invention as defined in the following claims.

Illustrative Embodiments Shown in the Figures

In one embodiment, the invention is a method of making a paint roller. A strip of material is helically wound around a mandrel so as to form a helically wound strip. The strip is formed from a compound of polypropylene and calcium carbonate having between 5% and 50% calcium carbonate by weight. The wound strip is advanced along the mandrel. A layer of adhesive is applied onto an outer surface of the wound strip. A strip of cover material then is helically wrapped about the wound strip and over the layer of adhesive, thereby bonding the strip of cover material to the wound strip for forming the paint roller.

In another embodiment, the invention is method of making a paint roller. A strip of material is helically wound around a mandrel so as to form a helically wound strip. The wound strip is advanced along the mandrel. An adhesive is compounded from polypropylene and calcium carbonate. The compound comprises between 5% and 50% calcium carbonate by weight. The layer of adhesive is applied onto an outer surface of the wound strip. A strip of cover material then is helically wrapped about the wound strip and over the layer of adhesive, thereby bonding the strip of cover material to the wound strip for forming the paint roller.

In another embodiment, the invention is method of making a paint roller. A strip of material helically wound around a mandrel so as to form a helically wound strip. The strip is formed from a compound of polypropylene and calcium carbonate having between 5% and 50% calcium carbonate by weight. The wound strip is advanced along the mandrel. An adhesive is compounded from polypropylene and calcium carbonate. The compound comprises between 5% and 50% calcium carbonate by weight. The layer of adhesive is applied onto an outer surface of the wound strip. A strip of cover material then is helically wrapped about the wound strip and over the layer of adhesive, thereby bonding the strip of cover material to the wound strip for forming the paint roller.

In another embodiment, the invention is a method for continuously producing a multi-strip laminate paint roller. An inner strip and an outer strip of material is helically advanced about a mandrel in offset relation. At least one of the strips is formed from a compound of polypropylene and calcium carbonate having between 5% and 50% calcium carbonate by weight. A layer of adhesive is applied between the two strips and on the outer surface of the outer strip. Prior to permitting the layer of liquid polypropylene to harden and set, a cover is wrapped around the outer strip and a compressing force is applied upon the cover urging the cover and the two strips toward the mandrel, thereby creating the continuous laminated paint roller.

In another embodiment, the invention is a method for continuously producing a multi-strip laminate paint roller. An inner strip and an outer strip of material is helically advanced about a mandrel in offset relation. An adhesive material is compounded from polypropylene and calcium carbonate, the compound comprising between 5% and 50% calcium carbonate by weight. The adhesive material is applied between the two strips and on the outer surface of the outer strip. Prior to permitting the adhesive material to harden and set, a cover is wrapped around the outer strip and a compressing force is applied upon the cover urging the cover and the two strips toward the mandrel, thereby creating the continuous laminated paint roller.

In another embodiment, the invention is a method for continuously producing a multi-strip laminate paint roller. An inner strip and an outer strip of material is helically advanced about a mandrel in offset relation, at least one of the strips being formed from a compound of polypropylene and calcium carbonate having between 5% and 50% calcium carbonate by weight. An adhesive material is compounded from polypropylene and calcium carbonate. The compound comprises between 5% and 50% calcium carbonate by weight. The adhesive material is applied between the two strips and on the outer surface of the outer strip. Prior to permitting the layer of liquid polypropylene to harden and set, a cover is wrapped around the outer strip and a compressing force is applied upon the cover urging the cover and the two strips toward the mandrel, thereby creating the continuous laminated paint roller.

In another embodiment, the invention is a method of making a composite cover material. A first width of pile material is advanced. The pile material has a pile side and a fabric backing, wherein the fabric backing is porous, having interstitial spaces or gaps. An adhesive is compounded from polypropylene and calcium carbonate. The compound comprises between 5% and 50% calcium carbonate by weight. A layer of the adhesive is applied to the fabric backing of the pile material. The adhesive layer is allowed to set to form a composite sheet material having a pile side and a non-porous backing. The composite sheet material is longitudinally cut to form one or more strips of composite cover material in a second width. The formed composite cover material has an inner surface and an outer surface, the outer surface comprising a pile, and the inner surface comprising a non-porous layer bonded thereto.

In another embodiment, the invention is a method of making a paint roller having one or more materials making up its core. An adhesive material is compounded from polypropylene and calcium carbonate. The compound comprises between 5% and 50% calcium carbonate by weight. The adhesive material is applied between a cover material and one or more materials making up the paint roller core. The adhesive material is permitted to harden and set, thereby creating the paint roller.

In another embodiment, the invention is a method of making a laminated paint roller. A strip comprising polypropylene is helically wound around a mandrel so as to form a helically wound strip, the strip having an outer surface. The wound strip is helically advanced along the mandrel. A layer of adhesive comprising polypropylene is applied onto the outer surface of the wound strip. A strip of composite cover material is then wrapped about the wound strip and over the layer of adhesive. The composite cover material is formed by method comprising the following steps. A width of porous pile material is provided having a pile side and an fabric underside. The width of pile material is advanced with the fabric underside facing up. A backing layer is compounded from polypropylene and calcium carbonate, the compound comprising between 5% and 50% calcium carbonate by weight. The backing layer is applied on the fabric underside of the advancing width of pile material so that the layer has one side that is in contact with the fabric underside of the advancing material and an other side that is not in contact with the advancing pile material, the layer being in molten form when it is applied. A compressive force is applied to the other side of the layer before the layer hardens and sets, to smooth the other side of the layer of polypropylene, and to urge the layer and the fabric underside of the pile material together, thereby forming a composite material having a smooth or uniformly imprinted non-porous side and a pile side, and wherein the pile is held fast on the composite material. The width of composite material is cut into a strip once the backing layer is no longer in molten form, thereby forming a composite cover material having an inner surface comprising a smooth or uniformly imprinted non-porous polypropylene side and a pile side. The composite cover material produced by the method described above is then used to form a laminated pain roller. A compressive force is applied from without the composite cover material to urge the composite cover material, the layer of adhesive and strip of non-porous polypropylene material together, thereby laminating the smooth inner surface of the composite cover material to the outer surface of the non-porous polypropylene strip.

In another embodiment, the invention is a method of making a laminated paint roller. An inner strip of thermoplastic material is helically around a mandrel so as to form a helically wound inner strip, the inner strip having an outer surface. A second strip of thermoplastic material is helically wound around a mandrel in offset relation to the inner strip, so as to form a helically wound second strip, the second strip having an inner surface and an outer surface. The wound inner and second strips are advanced along the mandrel. An adhesive is compounded from polypropylene and calcium carbonate, the compound comprising between 5% and 50% calcium carbonate by weight. A layer of the adhesive is applied onto the outer surface of the wound inner strip and the outer surface of the wound second strip. A strip of composite cover material is then wrapped about the wound second strip and over the layer of adhesive applied to the wound second strip. The composite cover material has an inner surface and an outer surface, the outer surface comprising a pile fabric, and the inner surface comprising a smooth generally non-porous backing comprising polypropylene. A compressive force is then applied from without the composite cover material to urge the composite cover material, the layer of adhesive and inner and second strips together, thereby laminating the inner surface of the composite cover material to the outer surface of the second strip and laminating the inner surface of the second strip to the outer surface of the inner strip.

In another embodiment, the invention is a method for continuously producing a multi-strip laminate paint roller. An inner strip and an outer strip of material is helically advanced about a mandrel in offset relation. At least one of the strips is formed from a compound of polypropylene and calcium carbonate having between 5% and 50% calcium carbonate by weight. The inner strip and the outer strip have an outer surface facing away from the mandrel. The outer surface of the inner and outer strips is heated to cause a layer of the outer surface of the strips to become liquefied. Prior to permitting the liquefied layers to harden and set, a cover around is wrapped around the outer strip and a compressing force is applied upon the cover urging the cover and the two strips toward the mandrel, thereby creating the continuous laminated paint roller.

In another embodiment, the invention is a cold core method of making a paint roller from a cold, hard, preformed hollow core of thermoplastic material of a predetermined length in which the cold hard hollow core and its associated cover are forged together to form a single unitary body. A cold hard hollow core is provided. The cold hard hollow core is formed from a compound of polypropylene and calcium carbonate having between 5% and 50% calcium carbonate by weight. A mandrel having an external diameter is provided. The mandrel slidably receives and makes contact with the cold hard hollow core. The cold hard hollow core is rotated. The exterior surface of the cold hard hollow thermoplastic rotating core is heated, by application of a single source of heat, to a temperature high enough to cause subsequently applied cover to adhere to said exterior surface. A cover is then to the heated exterior surface of the cold hard hollow thermoplastic core, thereby bonding the cover to the heated exterior surface thereof, and forming a paint roller.

Further Observations

In experimenting with various ratios and materials, several further observations have been made, and the inventions of such further observations and additional embodiments are hereinafter presented, in addition to those discussed above. Polypropylene identified as 3462-US, 4920WZ-US and 6823MZ-US from Total Petrochemicals of Houston, Tex. was used for experimentation. MFI reported herein for the polypropylene resin is as understood from Total Petrochemicals literature.

Calcium Carbonate

The use of non-refined calcium carbonate in combination with polypropylene, e.g., calcium carbonate that has not been surface treated, adds strength to the resulting paint roller product when compared to a combination of refined calcium carbonate in combination with polypropylene. Thus, in an embodiment, the calcium carbonate compounded with the polypropylene to form the compound adhesive 135 (FIG. 1) may be a non-refined calcium carbonate. In an embodiment, the non-refined calcium carbonate is used in a relatively fine, powdered form. In an embodiment the calcium carbonate may have a median particle size of 3 micrometers or less.

In an embodiment, a twin screw extruder (not shown) may be used to compound non-refined calcium carbonate and polypropylene together to form the compound adhesive 135. The twin screw extruder may accept a supply of polypropylene resin in pellet form and a separate supply of calcium carbonate.

Ratio and Composition of Compound Adhesive

Experimentation was performed concerning the ratio of calcium carbonate—a ratio earlier thought to be preferred between 5% and 50% calcium carbonate by weight. As discussed above, the cost by weigh of calcium carbonate is generally lower than the cost by weigh of polypropylene, thus, the raw material cost of a compounded adhesive will be reduced as the ratio of calcium carbonate rises. Typically, today, the cost of polypropylene resin may be $0.64 per pound, while the cost of appropriate calcium carbonate may be $0.09 per pound. Using those typical costs, the raw materials required to make a compounded adhesive comprising 5% calcium carbonate by weight is approximately $0.6125 per pound; the raw materials required to make a compounded adhesive comprising 50% calcium carbonate by weight is approximately $0.365 per pound; and the raw materials required to make a compounded adhesive comprising 60% calcium carbonate by weight is approximately $0.31 per pound. While the process of compounding the materials itself has a cost, the large factors in savings are: (i) the disparity between the cost of the polypropylene resin and the calcium carbonate; and (ii) the percentages of calcium carbonate that can be used.

Experimentation was performed and acceptable results were found using a compounded adhesive 135 (see FIG. 1) made from polypropylene resin with approximately 60% calcium carbonate by weight. In an embodiment, adhesive 135 is a compound of polypropylene and calcium carbonate having between 50% and 66% calcium carbonate by weight. In an embodiment an adhesive compound 135 comprises at least 55% but not more than 65% calcium carbonate. In an embodiment an adhesive compound 135 is a compound of polypropylene and calcium carbonate having approximately 60% calcium carbonate by weight.

Experimentation was performed and acceptable results were found using a compounded adhesive 335 (see FIG. 3) made from polypropylene resin with approximately 56% calcium carbonate by weight. In an embodiment, an adhesive 335 is a compound of polypropylene and calcium carbonate having at least 50%, but less than 60% calcium carbonate by weight. In an embodiment an adhesive compound 335 is a compound of polypropylene and calcium carbonate having approximately 56% calcium carbonate by weight.

Polypropylene resin 6823MZ-US in pellet form used to create adhesive first used for the further testing had a melt flow index ("MFI") of approximately 32. For the further testing, the 32 MFI resin was compounded with a 60% mixture of calcium carbonate to form the compound adhesive 135. The resulting compound adhesive 135 had an MFI of approximately 14.4. Although the compound adhesive could be extruded through applicator 130, the low MFI appeared to cause the extruded to struggle, and the extruded material was highly viscous. The paint rollers resulting from the foregoing compound appeared to be substantially stronger when non-refined calcium carbonate was used rather than surface treated calcium carbonate. When the same 32 MFI resin was compounded with the same 60% mixture of calcium carbonate to form the compound adhesive 335 (see FIG. 3), it appeared that the MFI of the compound adhesive 335 was too high to permit a smooth flow from the applicator 330.

Polypropylene resin 4920WZ-US was tried. Polypropylene resin 4920WZ-US in pellet form used to create adhesive next used for the further testing had a melt flow index ("MFI") of approximately 105. For the next test, the 105 MFI resin was compounded with a 60% mixture of calcium carbonate to form the compound adhesive 135. The resulting compound adhesive 135 had an MFI of approximately 28.8. Using the 105 MFI resin, the compound adhesive 135 was extruded through applicator 130 without substantial stress on the extruder as the compounded adhesive 135 was of appropriate viscosity for use with the applicator 130. Again, the paint rollers resulting from the foregoing compound was substantially stronger when non-refined calcium carbonate was used rather than surface treated calcium carbonate. When the same 105 MFI resin was compounded with the same 60% mixture of calcium carbonate to form the compound adhesive 335 (see FIG. 3), it again appeared that the MFI was too high to permit a smooth flow from the applicator 330.

As the vendor did not have polypropylene resin available with an MFI higher than 105, for the following test, the 105 MFI resin was compounded with a 56% mixture of calcium carbonate to form the compound adhesive 335. The resulting compound adhesive 335 had an MFI of approximately 32. Using the 105 MFI resin, the compound adhesive 335 was extruded through applicator 330 without substantial stress on the extruder as the compounded adhesive 335 was of appropriate viscosity for use with the applicator 330. As before, the paint rollers resulting from the foregoing compound appeared to be substantially stronger when non-refined calcium carbonate was used rather than surface treated calcium carbonate. As an alternative to reducing ratio of calcium carbonate to 56%, the use of a polypropylene resin having a higher MFI, such as an MFI of approximately 120, with 60% calcium carbonate would have achieved acceptable results.

Composition of Strips

As with composite adhesives 135, 335, strip material 145, 345, 348, 445, 448 can be manufactured using a compound of polypropylene and calcium carbonate. In an embodiment, a strip 145, 345, 348, 445, 448 is cut lengthwise from a sheet material (not shown) that is manufactured using a compound of polypropylene and calcium carbonate. In an embodiment, the thickness of the sheet material is determined by successive rollers. Because rollers are used to control thickness, the MFI of the polypropylene/calcium carbonate compound may be substantially lower than that of the MFI required for use a compound adhesives 135, 335. In an embodiment, 4.1 MFI polypropylene resin 3462-US is compounded with approximate 60% by weight of calcium carbonate. The resulting polypropylene/calcium carbonate compound, having an MFI of approximately 2, can be run through successive rollers to reach a desired thickness. Almost any desired strip thickness can be attained. In an embodiment, a sheet of polypropylene/calcium carbonate compound material having thickness of approximately 10 mil, 15 mil, 20 mil or 25 mil can be cut longitudinally into one or more strip 145, 345, 348, 445, 448.

In an embodiment, the calcium carbonate used in manufacturing sheet material which can be cut into strips is non-refined calcium carbonate.

Composite Cover Material

Returning to FIG. 2, an apparatus 200 is shown for forming the composite paint roller cover 250 having a compound backing A layer of compound adhesive 210 is dispensed by an applicator 205. The layer of compound adhesive 210 dispensed may be dispensed onto roller 220 or directly onto cover material 215. In an embodiment, the layer of compound adhesive 210 is between 0.010" and 0.020". In an embodiment, the compound adhesive 210 is a compound of polypropylene and calcium carbonate having at least 50%, and not more than 66% calcium carbonate by weight. The MFI of polypropylene/calcium carbonate compound the may be varied by changing using a polypropylene resin having a higher or lower MFI, as well as by varying the ratio of calcium carbonate. Using polypropylene resin having a higher MFI will cause the polypropylene/calcium carbonate compound to have a higher MFI when using the same ratio of calcium carbonate. Similarly, the MFI of the resulting compound can be lowered by reducing the percentage of calcium carbonate used in the polypropylene/calcium carbonate compound. In view of the foregoing, it will be apparent to one of skill in the art how to the MFI of polypropylene/calcium carbonate compound layer 210 can be varied so as to permit it to be dispensed appropriately by an applicator 205.

In an embodiment, the cover material 215 has a pile side and a fabric backing—the fabric backing being porous and having interstitial spaces sufficient to permit penetration of compound adhesive 210. In an embodiment, the compound adhesive 210 has an MFI higher than 2. In an embodiment, the compound adhesive 210 has an MFI between 14 and 105. In an embodiment, an MFI of in or around the mid 70's is desired to permit the compound 210 to properly permeate the fabric backing of the cover material 215. To obtain compound adhesive 210 having an MFI in or around the mid-70's 105 MFI polypropylene resin is compounded with 25% calcium carbonate by weight.

In an embodiment, the apparatus comprises an applicator 205 that applies a compound adhesive 210 formed by a twin screw extruder sufficient for compounding calcium carbonate with polypropylene (not shown) from a supply of polypropylene resin in pellet form and a supply of calcium carbonate to produce a compound that includes at least 50% calcium carbonate by weight.

Illustrative Paint Rollers

Returning to FIG. 1, in an embodiment, a strip 145 comprises polypropylene, and has a thickness of between 10 mil and 40 mil. In an embodiment, the strip 145 is approximately 10 mil, 15 mil, 20 mil or 25 mil thick. In an embodiment, the strip 145 may be of another suitable thickness.

In an embodiment, the strip 145 is made from a polypropylene/calcium carbonate compound comprising at least 50%, but not more than 66% calcium carbonate by weight. In an embodiment, the strip 145 is made from a polypropylene/calcium carbonate compound comprising approximately 60% calcium carbonate by weight. The strip 145 made from a polypropylene/calcium carbonate compound comprising at least 50% calcium carbonate by weight, is expected to have higher thermal conductivity than a strip made from polypropylene alone, or than a strip made from a polypropylene/calcium carbonate compound comprising less than 50% calcium carbonate by weight. Because of the higher thermal conductivity using a strip 145 made from a compound of polypropylene and calcium carbonate comprising at least 50% calcium carbonate by weight, it is anticipated that the adhesive 135 will set faster, and thus, apparatus 100 will operate at higher overall throughput than it would when using a strip 145 comprising more than 50% polypropylene.

In an embodiment, adhesive 135 comprises polypropylene, and is applied in a layer having a thickness of between 10 mil and 40 mil. In an embodiment, the layer of adhesive 135 is approximately 10 mil, 15 mil, 20 mil or 25 mil thick. In an embodiment, the layer of adhesive 135 is another suitable thickness.

In an embodiment, the adhesive 135 is made from a polypropylene/calcium carbonate compound comprising at least 50%, but not more than 66% calcium carbonate by weight. In an embodiment, the adhesive 135 is made from a polypropylene/calcium carbonate compound comprising approximately 60% calcium carbonate by weight. The adhesive 135 made from a polypropylene/calcium carbonate compound comprising at least 50% calcium carbonate by weight, is expected to have higher thermal conductivity than an adhesive made from polypropylene alone, or than an adhesive made from a polypropylene/calcium carbonate compound comprising less than 50% calcium carbonate by weight. Because of the higher thermal conductivity using an adhesive 135 made from a compound of polypropylene and calcium carbonate comprising at least 50% calcium carbonate by weight, it is anticipated that it will set faster, and thus, apparatus 100 will operate at higher overall throughput than it would when using an adhesive 135 comprising more than 50% polypropylene.

In an embodiment, the backing of composite cover 125 comprises polypropylene, and the backing comprising polypropylene is in a layer having a thickness of between 10 mil and 40 mil. In an embodiment, the backing layer of the composite cover material 125 is approximately 10 mil, 15 mil, 20 mil or 25 mil thick. In an embodiment, the backing of the composite cover material 125 is another suitable thickness.

In an embodiment, the backing of the composite cover material 125 is formed from a polypropylene/calcium carbonate compound comprising at least 50%, but not more than 66% calcium carbonate by weight. In an embodiment, the backing of the composite cover material 125 is formed from a polypropylene/calcium carbonate compound comprising approximately 60% calcium carbonate by weight. The backing of the composite cover material 125 formed from a polypropylene/calcium carbonate compound comprising at least 50% calcium carbonate by weight, is expected to have higher thermal conductivity than a backing made from polypropylene alone, or than a backing made from a polypropylene/calcium carbonate compound comprising less than 50% calcium carbonate by weight. Because of the higher thermal conductivity using a composite cover material 125 having a backing formed from a compound of polypropylene and calcium carbonate comprising at least 50% calcium carbonate by weight, it is anticipated that the adhesive 135 will set faster, and thus, apparatus 100 will operate at higher overall throughput than it would when using a composite cover material 125 having a backing formed from a compound of polypropylene and calcium carbonate comprising more than 50% polypropylene.

The following tables presents illustrative paint rollers that will be used in the discussion below.

|  | Cover | Adhesive | Strip |
|---|---|---|---|
| Example A1 | 0/0% | 10/0% | 20/0% |
| Example A2 | 10/0% | 10/0% | 20/0% |

The following tables presents illustrative paint rollers that can be formed using the invention disclosed herein. The "Cover" column refers to the cover material 125 used, the "Adhesive" column refers to the adhesive 135 used and the "Strip" column refers to the strip 145 used in the example. For each column, the entry reflects the thickness in mil, and the percentage of calcium carbonate (by weight) compounded with polypropylene to form the component. The thickness in mil for the "Cover" column reflects the thickness of the layer 210 used to form the composite cover material 250—the "Cover" column entries showing a thickness of 0 reflect the use of a cover material rather than a composite cover material.

|  | Cover | Adhesive | Strip |
|---|---|---|---|
| Example B1 | 0/0% | 10/60% | 20/60% |
| Example B2 | 10/0% | 10/60% | 20/60% |
| Example B3 | 10/25% | 10/60% | 20/60% |

Example A1 and B1, each make paint rollers of the same thickness, however, the characteristics of the paint roller B1 are substantially improved when compared to those of A1. The B1 paint roller feels firmer and is of higher quality than the A1 paint roller. Moreover, the 30 mil thick B1 paint roller uses only 40% of the polypropylene used to manufacture the A1 paint roller (excluding any polypropylene in the cover material).

Similarly, Example A2 and B2, each make paint rollers of the same thickness, however, the characteristics of the paint roller B2 are substantially improved when compared to those of A2. The B2 paint roller feels firmer and is of higher quality than the A2 paint roller. Moreover, the 40 mil thick B2 paint roller uses only 55% of the polypropylene used to make the A2 paint roller (excluding any polypropylene in the cover material). In fact, the B1 paint roller compares favorably to the A2 paint roller while using only as much as 30% as much polypropylene.

Notably the B3 paint roller is the most superior of all of these example rollers, and it uses less than half as much polypropylene as the A2 roller, and just over half as much as the A1 roller.

Many other variations are possible. For example, it is not necessary to use both a compound adhesive and a strip formed from compounding polypropylene and calcium carbonate. In addition, it is not necessary to use a composite cover material formed from a compound of polypropylene/calcium carbonate. The use of (i) a compound strip, (ii) compound adhesive or (ii) composite cover material formed from a compound of polypropylene/calcium carbonate, will each produce a stronger roller, with less polypropylene, than the use of same component made from non-compound polypropylene.

Returning now to FIG. 3, in an embodiment, strips 345, 348 comprises polypropylene, and each have a thickness of between 10 mil and 40 mil. In an embodiment, strips 345, 348 are each approximately 10 mil, 15 mil, 20 mil or 25 mil thick. In an embodiment, strips 345, 348 may be of another suitable thickness. It is not necessary that each of the strips 345, 348 are the same thickness.

In an embodiment, at least one strip 345, 348 is made from a polypropylene/calcium carbonate compound comprising at least 50%, but not more than 66% calcium carbonate by weight. In an embodiment, at least one strip 345, 348 is made from a polypropylene/calcium carbonate compound comprising approximately 60% calcium carbonate by weight. A strip 345, 348 made from a polypropylene/calcium carbonate compound comprising at least 50% calcium carbonate by weight, is expected to have higher thermal conductivity than a strip made from polypropylene alone, or than a strip made from a polypropylene/calcium carbonate compound comprising less than 50% calcium carbonate by weight. Because of the higher thermal conductivity using at least one strip 345, 348 made from a compound of polypropylene and calcium carbonate comprising at least 50% calcium carbonate by weight, it is anticipated that the adhesive 335 will set faster, and thus, apparatus 100 will operate at higher overall throughput than it would when using strips 345, 348 comprising more than 50% polypropylene.

In an embodiment, adhesive 335 comprises polypropylene, and is applied in a layer having a thickness of between 10 mil and 40 mil. In an embodiment, the layer of adhesive 335 is approximately 10 mil, 15 mil, 20 mil or 25 mil thick. In an embodiment, the layer of adhesive 335 is another suitable thickness.

In an embodiment, the adhesive 335 is made from a polypropylene/calcium carbonate compound comprising at least 50%, but not more than 66% calcium carbonate by weight. In an embodiment, the adhesive 335 is made from a polypropylene/calcium carbonate compound comprising approximately 60% calcium carbonate by weight. The adhesive 335 made from a polypropylene/calcium carbonate compound comprising at least 50% calcium carbonate by weight, is expected to have higher thermal conductivity than an adhesive made from polypropylene alone, or than an adhesive made from a polypropylene/calcium carbonate compound comprising less than 50% calcium carbonate by weight. Because of the higher thermal conductivity using an adhesive 335 made from a compound of polypropylene and calcium carbonate comprising at least 50% calcium carbonate by weight, it is anticipated that it will set faster, and thus, apparatus 100 will operate at higher overall throughput than it would when using an adhesive 335 comprising more than 50% polypropylene.

In an embodiment, the backing of cover 325 comprises polypropylene, and the backing comprising polypropylene is in a layer having a thickness of between 10 mil and 40 mil. In an embodiment, the backing layer of the composite cover material 325 is approximately 10 mil, 15 mil, 20 mil or 25 mil thick. In an embodiment, the backing of the composite cover material 325 is another suitable thickness.

In an embodiment, the backing of the composite cover material 325 is formed from a polypropylene/calcium carbonate compound comprising at least 50%, but not more than 66% calcium carbonate by weight. In an embodiment, the backing of the composite cover material 325 is formed from a polypropylene/calcium carbonate compound comprising approximately 60% calcium carbonate by weight. The backing of the composite cover material 325 formed from a polypropylene/calcium carbonate compound comprising at least 50% calcium carbonate by weight, is expected to have higher thermal conductivity than a backing made from polypropylene alone, or than a backing made from a polypropylene/calcium carbonate compound comprising less than 50% calcium carbonate by weight. Because of the higher thermal conductivity using a composite cover material 325 having a backing formed from a compound of polypropylene and calcium carbonate comprising at least 50% calcium carbonate by weight, it is anticipated that the adhesive 335 will set faster, and thus, apparatus 100 will operate at higher overall throughput than it would when using a composite cover material 325 having a backing formed from a compound of polypropylene and calcium carbonate comprising more than 50% polypropylene.

The following tables presents illustrative paint rollers that will be used in the discussion below.

|  | Cover | Adhesive | Strip 1 | Strip 2 |
| --- | --- | --- | --- | --- |
| Example C1 | 0/0% | 10/0% | 10/0% | 10/0% |
| Example C2 | 10/0% | 10/0% | 10/0% | 10/0% |
| Example C3 | 10/0% | 10/0% | 20/0% | 20/0% |
| Example C4 | 0/0% | 10/0% | 20/0% | 20/0% |

The following tables presents illustrative paint rollers that can be formed using the invention disclosed herein. The "Cover" column refers to the cover material 325 used, the "Adhesive" column refers to the adhesive 335 used, the "Strip 1" column refers to the strip 345 used and the "Strip 2" column refers to the strip 348 used in the example. As above, for each column, the entry reflects the thickness in mil, and the percentage of calcium carbonate (by weight) compounded with polypropylene to form the component. The thickness in mil for the "Cover" column reflects the thickness of the layer 210 used to form the composite cover material 250—the "Cover" column entries showing a thickness of 0 reflect the use of a cover material rather than a composite cover material.

|  | Cover | Adhesive | Strip 1 | Strip 2 |
| --- | --- | --- | --- | --- |
| Example D1 | 0/0% | 10/56% | 10/60% | 10/60% |
| Example D2 | 10/0% | 10/56% | 10/60% | 10/60% |

-continued

|  | Cover | Adhesive | Strip 1 | Strip 2 |
| --- | --- | --- | --- | --- |
| Example D3 | 10/25% | 10/56% | 10/60% | 10/60% |
| Example D4 | 10/25% | 10/56% | 20/60% | 20/60% |

Example C1 and D1, each make paint rollers of the same thickness, however, the characteristics of the paint roller D1 are substantially improved when compared to those of C1. The D1 paint roller feels firmer and is of higher quality than the C1 paint roller. Moreover, the 40 mil thick core of the D1 paint roller uses only 42% of the polypropylene used to manufacture the C1 paint roller (excluding any polypropylene in the cover material).

Example D2 forms a paint roller with very good properties and firmness. This roller compares favorably to Example D1 due to its extra 10 mil thickness. Moreover, Example D2 compare favorably not only to Example C1, but to Example C2 having a core of the same thickness (50 mil), and even to Example C3, despite Example C3 having a core of 70 mil and using substantially more than twice as much polypropylene. Example D3 makes an even better paint roller, while Example D4 makes an excellent quality paint roller. Notably, while Example D4 is the same core thickness as example C3, it uses only about 46% as much polypropylene.

As above, many other variations are possible. For example, it is not necessary to use both a compound adhesive and a strip formed from compounding polypropylene and calcium carbonate. Moreover, it is not necessary to form both strips from a compound adhesive. In addition, it is not necessary to use a composite cover material formed from a compound of polypropylene/calcium carbonate. The use of (i) a compound strip, (ii) compound adhesive or (ii) composite cover material formed from a compound of polypropylene/calcium carbonate, will each produce a stronger roller, with less polypropylene, than the use of same component made from non-compound polypropylene.

Further, it has been observed that the two-strip 60 mil core roller of Example C4 provides approximately the same qualities as the single strip, 40 mil core roller of Example A2, while the latter roller uses only about 37% as much polypropylene. Also, notably, the two-strip 50 mil core Example D2 provides a much stronger roller than the two-strip 60 mil core roller made according to Example C4.

Returning to FIG. 4, in an embodiment, one or both of the strips 445, 448 can be made from a compound of polypropylene and calcium carbonate having at least 50%, but not more than about 66% calcium carbonate by weight. Similarly, in an embodiment the cover 415 may having a backing made of a compound of polypropylene and calcium carbonate having at least 50% but not more than 66% calcium carbonate by weight. As discussed above, the percentage of calcium carbonate used in the compound forming the strips 448, 445 and the cover 415 backing may be the same, or may differ from one-another.

In an embodiment, the strips 445, 448 are made from a compound of polypropylene and calcium carbonate having approximately 60% calcium carbonate, and the cover 415 has a backing made of a compound of 105 MFI polypropylene and non-refined calcium carbonate having approximately 25% calcium carbonate by weight.

Returning to FIG. 5 Apparatus 500 may be operated according to the present invention using a preformed core 540 made of a compound of polypropylene and calcium carbonate having at least 50%, but not more than 66% calcium carbonate by weight; and/or using a cover 520 having a backing made of a compound of polypropylene and calcium carbonate having between 5% and 66% calcium carbonate by weight. When more than one component is made of a compound of polypropylene and calcium carbonate, the percentage of calcium carbonate used in the compound forming the core 540 and the cover 520 backing may be the same, or may differ from one-another. In an embodiment, the core 540 is made of a compound of polypropylene and calcium carbonate comprising approximately 60% calcium carbonate by weight, and the cover backing is made of a compound of polypropylene and calcium carbonate comprising approximately 25% calcium carbonate by weight.

As discussed above Variation in the amount of calcium carbonate are within the scope of the invention, and thus, it will be apparent to one of skill in the art that to some degree thermal conductivity can be controlled, or a desired thermal conductivity or range of thermal conductivity can be achieved by varying the percentage of calcium carbonate in one or more of the compounds. It will be apparent to one of skill in the art that to some degree, stiffness can be controlled, or a desired stiffness or range of stiffness can be achieved by varying the percentage of calcium carbonate in these compounds as well.

It is possible, without departing from the invention, to use a compound of polypropylene and calcium carbonate having between 50% and 60% calcium carbonate by weight in lieu of polypropylene in making paint rollers. In light of this disclosure, other methods for the manufacture of the same will be apparent to persons of skill in the art.

Benefits of certain embodiments of the instant invention include: control of thermal conductivity in the component materials leading to faster throughput and/or faster set times; and control of material characteristics such as stiffness for manufacture of harder, more expensive paint rollers.

The above embodiments and preferences are illustrative of the present invention. It is neither necessary, nor intended for this patent to outline or define every possible combination or embodiment. The inventor has disclosed sufficient information to permit one skilled in the art to practice at least one embodiment of the invention, and has disclosed the ways the inventor now believes are the best ways to practice the invention. The above description and drawings are merely illustrative of the present invention and that changes in components, structure and procedure are possible without departing from the scope of the present invention as defined in the following claims. Thus, while the invention has been particularly shown and described with reference to embodiments thereof, it will be understood by those skilled in the art that various changes in form and details may be made therein without departing from the spirit and scope of the invention. The above embodiments are illustrative of the present invention. It is neither necessary, nor intended for this patent to outline or define every possible combination or embodiment.

What is claimed is:

1. A method of making a laminated paint roller comprising:
    helically winding inner and outer strips comprising polypropylene around a mandrel so as to form a pair of helically wound strips, the strips each having an outer surface;
    advancing the wound strips along the mandrel;
    applying a molten layer of adhesive comprising polypropylene onto at least a portion of the outer surface of each of the wound strips; and
    wrapping a strip of composite cover material about the wound strip and over the layer of adhesive, the composite cover material being formed by:
        providing a width of porous pile material having a pile side and a fabric underside;
        advancing the width of pile material with the fabric underside facing up;
        extruding a polypropylene-based material to form a smoothly flowing layer;
        applying the smoothly flowing layer as a backing layer having a thickness of up to 40 mils on the fabric underside of the advancing width of pile material so that the layer has one side that is in contact with the fabric underside of the advancing material and an other side that is not in contact with the advancing pile material, the layer being in molten form when it is applied;
        applying a compressive force to the other side of the layer before the layer hardens and sets, to smooth the other side of the layer of polypropylene, and to urge the layer and the fabric underside of the pile material together, thereby forming a composite material having a smooth or uniformly imprinted non-porous side and a pile side, and wherein the pile is held fast on the composite material;
        slitting the width of composite material into a strip once the backing layer is no longer in molten form, thereby forming a composite cover material having an inner surface comprising a smooth or uniformly imprinted non-porous polypropylene side and a pile side; and
    applying a compressive force from without the composite cover material to urge the composite cover material, the layer of adhesive and the inner and outer strips together.

2. The method of making a laminated paint roller claimed in claim 1, wherein (i) extruding a backing layer, and (ii) applying a backing layer, are performed by a twin screw extruder that receives polypropylene in pellet form from a polypropylene feeder, and receives calcium carbonate from a calcium carbonate feeder.

3. The method of claim 1, wherein the adhesive is compounded from polypropylene and calcium carbonate, the compound comprising at least 5% but not more than 66% calcium carbonate by weight.

4. The method of claim 1, wherein at least one of the inner and outer strips comprising polypropylene comprises at least 25% but not more than 66% calcium carbonate by weight.

5. A method of making a laminated paint roller comprising:
    helically winding a plurality of strips comprising polypropylene material around a mandrel so as to form a plurality of helically wound strips, each of the plurality of strips having an outer surface;
    advancing the wound strips along the mandrel;
    applying a molten layer of polypropylene adhesive onto at least a portion of the outer surface of each of plurality of wound strips; and
    wrapping a strip of composite cover material about at least one of the wound strips and over the layer of adhesive, the composite cover material having an inner surface and an outer surface, the outer surface comprising a pile, and the inner surface having been formed by extruding a smoothly flowing, non-porous layer comprising polypropylene, the layer having a thickness of up to 40 mils; and applying a compressive force from without the composite cover material to urge the composite cover material, the layer of adhesive and the plurality strips together.

6. The method of claim 5, wherein the adhesive comprises at least 5% but not more than 66% calcium carbonate by weight.

7. The method of claim 5, wherein at least one of the plurality of strips comprises at least 25% but not more than 66% calcium carbonate by weight.

8. A method of making a laminated paint roller comprising:
    helically winding a strip comprising polypropylene around a mandrel so as to form a helically wound strip, the strip having an outer surface;
    advancing the wound strip along the mandrel;
    applying a molten layer of adhesive comprising polypropylene onto the outer surface of the wound strip; and
    wrapping a strip of composite cover material about the wound strip and over the layer of adhesive, the composite cover material having a backing having a thickness of up to 40 mils, the backing comprising polypropylene; and,
    allowing the adhesive to cool, thereby laminating the composite cover material with the outer surface of the wound strip.

9. The method of claim 8 further comprising:
    applying a compressive force from without the composite cover material to urge the composite cover material, the layer of adhesive and strip together.

10. The method of claim 8, wherein the adhesive comprises at least 5% but not more than 66% calcium carbonate by weight.

11. The method of claim 5, wherein at least one of the strips comprising polypropylene comprises at least 25% but not more than 66% calcium carbonate by weight.

12. A method of making a laminated paint roller comprising:
    helically winding a plurality of strips comprising polypropylene around a mandrel so as to form a plurality of helically wound strips, each of the strips having an outer surface;
    advancing the helically wound strips along the mandrel;
    applying a molten layer of adhesive comprising polypropylene onto the outer surface of each of the plurality of wound strips; and
    wrapping a strip of composite cover material about the plurality of wound strips and over the layer of adhesive, the composite cover material having a backing having a thickness of up to 40 mils, the backing comprising polypropylene; and,
    allowing the adhesive to cool, thereby laminating together the composite cover material and the plurality of wound strips.

13. The method of claim 1 further comprising:
    applying a compressive force from without the composite cover material to urge the composite cover material, the layer of adhesive and the plurality of strips together.

14. The method of claim 12, wherein the adhesive comprises at least 5% but not more than 66% calcium carbonate by weight.

15. The method of claim 12, wherein at least one of the plurality of strips comprises at least 25% but not more than 66% calcium carbonate by weight.

* * * * *